10 United States Patent Office 3,169,991
Patented Feb. 16, 1965

3,169,991
(GAMMA-AMINOPROPYL) AMINOHYDROXY-
ALKYL AMINES
Edgar R. Rogier, Hopkins, Minn., assignor to General
Mills, Inc., a corporation of Delaware
No Drawing. Filed Dec. 21, 1960, Ser. No. 77,295
6 Claims. (Cl. 260—570.5)

This invention relates to novel amino hydroxy alkyl-amines and more particularly to (gamma-aminopropyl)-amino-hydroxy-alkyl amines including amino-substituted derivatives.

The novel compounds of the present invention may be represented by the formula:

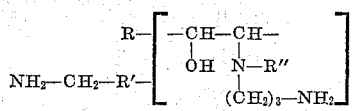

where R and R' are aliphatic hydrocarbon groups of 0 to 20 carbon atoms, preferably 5 to 17 carbon atoms, and wherein the total number of carbon atoms in R and R' is in the range of 5 to 21 carbon atoms, preferably 9 to 17 carbon atoms and R'' is hydrogen, aliphatic, aryl or hydroxyalkyl. The above formula represents two groups of isomeric compounds which may be illustrated by the formulas:

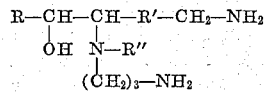

and

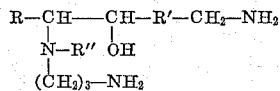

wherein R, R' and R'' are as defined above. Hereinafter the description will be restricted to one isomeric form; however, it will be understood that the description applies equally to both isomers.

The compounds of the present invention can be prepared from any unsaturated higher fatty acid having 8 to 24 carbon atoms. Illustrated below is a typical preparation of a 9-(gamma-amino-propyl) amino-10-hydroxy-stearyl amine from oleic acid:

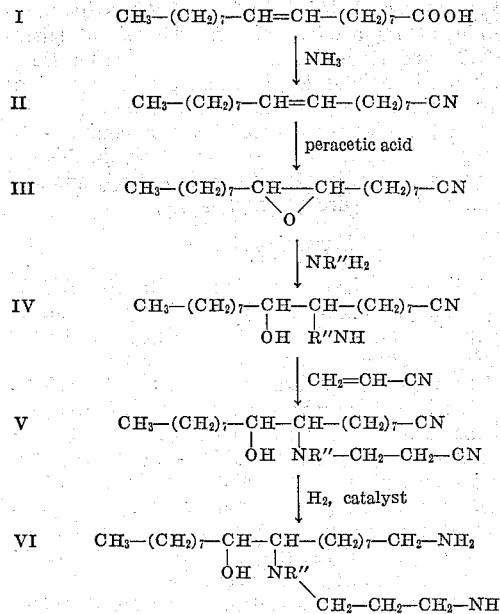

where R'' is hydrogen, aliphatic, aryl or hydroxyalkyl.

The unsaturated fatty nitriles (II) may be prepared by reacting ammonia and an unsaturated higher fatty acid (I), such as oleic, erucic, eleostearic, linoleic, linolenic clupanodonic, palmitoleic and palmitolenic acids, forming thereby unsaturated fatty nitriles (II) having an even number of carbon atoms. Since natural higher fatty acids having an odd number of carbon atoms are rare, unsaturated fatty nitriles (II) having an odd number of carbon atoms are preferably prepared by the reaction of an unsaturated alkyl halide and an inorganic cyanide. The unsaturated higher fatty acids, supra, occur naturally in animal and vegetable fats and oils. The unsaturated alkyl halides may be prepared by converting an unsaturated fatty acid to an alcohol and subsequently reacting the alcohol with a halogen acid to form the unsaturated alkyl halide.

The unsaturated nitrile (II) is converted to the epoxy nitrile (III) by treatment with peracetic acid under typical epoxidation conditions. The epoxy nitrile (III) can be converted to the aminohydroxy nitrile (IV) by treatment with ammonia or any primary amino compound. If ammonia is used, a primary-aminohydroxy nitrile is formed, illustrated by the product IV wherein R'' is hydrogen. If a primary amino compound is used to open the epoxide ring of the epoxy nitrile (III), the product is a secondary amine as illustrated by product IV wherein R'' is the radical derived from the primary amino compound reactant. Suitable primary amino compounds are the aliphatic primary amines such as methyl amine, ethyl amine, hexyl amine, octyl amine, and stearyl amine, the aryl amines such as the amino phenols, the hydroxy alkyl amines containing from 1 to 4 carbon atoms, such as ethanol amine and the polyamines such as ethylene diamine, diethylene triamine, triethylenetetramine, and propylene diamine. Thus, it should be apparent that the primary amino compound used to split the epoxy compound is most uncritical and, in fact, any primary amino compound, as well as ammonia, may be employed therefor. The preparation of amino-hydroxy nitriles is described in greater detail in the copending application of Edgar R. Rogier, S.N. 849,440, filed October 29, 1959, now U.S. Patent 3,081,304.

The cyano-ethylated aminohydroxy nitrile (V) is prepared by reacting an aminohydroxy nitrile (IV) with acrylonitrile. The preparation of cyanoethylated amino compounds is further described in the copending application of Edgar R. Rogier, S.N. 19,170, filed April 1, 1960.

The final step in obtaining the novel products of the present invention, as illustrated above, is the hydrogenation of the nitrile groups of the cyano-ethylated hydroxy nitrile (V) to form the (gamma-aminopropyl) amino hydroxy amine (VI). Generally any of the methods of the prior art used to hydrogenate nitriles to amines are suitable. A particularly satisfactory method utilizes Raney nickel and hydrogen at a moderate temperature (50–150° C.) and pressure (50–1500 p.s.i.g.).

As stated hereinbefore the preparation of the compounds of the present invention by the method illustrated above will produce a mixture of two isomers since the epoxy ring may be split at either carbon to oxygen bond. In the reaction scheme shown above, the two isomers would be formed:

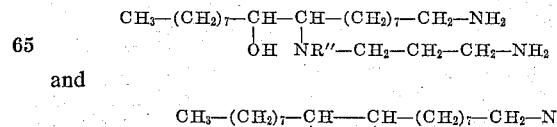

where R'' is as previously described. These groups of compounds are the 9-(gamma-aminopropyl)-amino-10- hydroxy stearyl amines and 10-(gamma-aminopropyl)-amino-9-hydroxystearyl amines, respectively. Isomers of this type are conveniently referred to by an alternative nomenclature, e.g., 9(10)-(gamma-aminopropyl)-amino-10(9)-hydroxy stearyl amines.

When an acid having more than one unsaturated double bond is employed as a starting material, each double bond is epoxidized, the epoxy rings opened by ammonia or an amine, the nitrogen atoms cyanoethylated and the cyanoethylated product hydrogenated, thereby forming a product having a plurality of hydroxyl substituents and a plurality of (gamma-aminopropyl)-amino substituents. For example, when linoleic acid treated by the above-mentioned preparatory procedure, there is formed a compound having the formula:

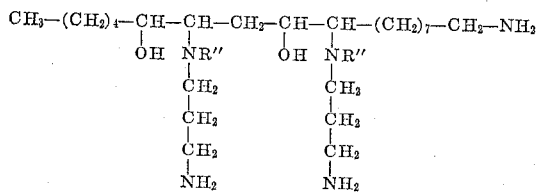

where R″ is as previously described. In addition to this compound, there is formed three position isomers wherein the positions of the hydroxyl and amino substituents on the adjacent carbon atoms, are reversed.

Another preferred starting acid is mono-unsaturated hydrogenation product of linoleic acid. This product is a mixture of acids having unsaturation between the number 9 and 10 carbon atoms and acids having unsaturation between the number 12 and 13 carbon atoms. The 9–10 unsaturate is oleic acid which gives the 9(10)-(gamma-aminopropyl)-amino - 10(9) - hydroxystearyl amines described above. The 12–13 unsaturate, when treated by a similar procedure, gives the 12(13)-(gamma-aminopropyl)-amino-13(12)-hydroxystearyl amines which have the formula:

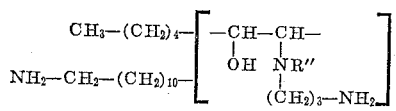

where R″ is as previously described.

Still another group of preferred products are those prepared from palmitoleic acid. These compounds have the formula:

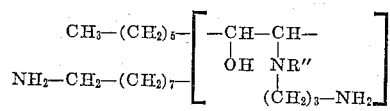

where R″ is as previously described.

Thus, the most preferred group of compounds may be represented by the formula:

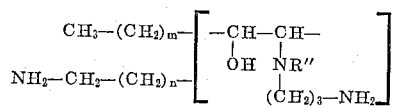

where R″ is as previously described and where $m+n$ is 12 or 14.

An alternate method of preparing the compounds of the present invention is by the hydrogenation of the corresponding amides. For example 9(10)-(gamma-aminopropyl)-10(9)-hydroxystearyl amine is prepared by hydrogenating 9(10)-(beta-cyanoethyl)-amino - 10(9) - hydroxystearamide. Such hydrogenation is preferably carried out under the pressure of an atmosphere of hydrogen in the presence of a hydrogenation catalyst, such as Raney nickel or copper-chromite. Other hydrogenation methods, such as treatment with lithium aluminum hydride, may be employed if desired.

In order to further illustrate various aspects of the present invention as well as the preferred embodiments thereof, the following examples are included. Unless otherwise indicated all parts and percentages used herein are by weight.

Example I

Into a 1 liter autoclave were charged 42 g. of 9(10)-(beta-cyanoethyl)-amino-10(9)-hydroxystearonitrile, 250 ml. of methanol, 5 g. of Raney nickel, and 22 g. of ammonia. The mixture was agitated at 100–120° C. under 800–1000 p.s.i. of hydrogen pressure for 4–5 hours. The catalyst was removed by filtration and the solvent evaporated under reduced pressure. There was recovered 41 g. of 9(10)-(gamma-aminopropyl)-amino-10(9)-hydroxy stearyl amine having an amine value of 421 and an acetyl value of 598 as compared to theoretical values of 471 and 628 respectively. Substantially the same results are obtained by substituting as a starting material, 9(10)-(beta-cyanoethyl)-amino-10(9)-hydroxy, palmitonitrile.

Example II

Into a 1 liter autoclave were charged 81 g. of 9(10)-(beta-cyanoethyl) methylamino-10(9) - hydroxystearonitrile having a total amine number of 158 and a tertiary amine number of 157, 150 ml. of methanol, 22 g. of wet Raney nickel, and 26 g. of ammonia. The reaction mixture was agitated at 110° C. under 590 p.s.i. of hydrogen pressure for 5 hours. After removal of the solvent and catalyst there was recovered 77 g. of 9(10) - (gamma-aminopropyl)-methylamino-10(9)-hydroxy stearyl amine having a total amine number of 443 (theoretical=453) and an amine number of 150 after treatment with salicylaldehyde (a measure of the total secondary and tertiary amine groups in the compound; theoretical=151). There is obtained 9(10)-(gamma-aminopropyl)-anilino-10(9)-hydroxy-stearyl amine by substituting as the starting material of this example, 9(10)-beta-cyanoethyl)-anilino-10 (9)-hydroxystearonitrile.

Example III

Into a 1 liter autoclave were charged 79 g. of 9(10)-(beta-cyanoethyl) dodecylamino-10(9)-hydroxystearo-nitrile having a total amine number of 110 and a tertiary amine number of 99, 150 ml. of methanol, 17 g. wet Raney nickel and 22 g. ammonia. The reaction mixture was agitated at 110° C. under 580 p.s.i. of hydrogen pressure for 3 hours. After removal of the catalyst and methanol solvent, there was recovered 80 g. of 9(10)-(gamma-aminopropyl)-dodecylamino - 10(9) - hydroxystearyl amine having a total amine number of 306 (theoretical=320) and an amine number of 100 after treatment with acetic anhydride (a measure of the tertiary amine groups in the compound; theoretical=107). By substituting 9(10)-(beta-cyanoethyl) ethanolamino - 10 (9)-hydroxystearonitrile as a starting material in this example, there is obtained 9(10)-(gamma - propylamino)-ethanolamino-10(9)-hydroxystearyl amine.

Example IV

Into a 1 liter autoclave were charged 30 g. of 9(10)-di(beta-cyanoethyl) amino-10(9) - hydroxystearonitrile having a total amine number of 141.7, 15 g. wet Raney nickel, 200 g. absolute methanol and 18 g. anhydrous ammonia. The reaction mixture was agitated at 130° C. under 750 p.s.i. of hydrogen for four hours. After removal of the solvent there was recovered 28 g. of 9(10)-di(gamma-aminopropyl) amino-10(9) - hydroxystearyl-amine having an amine number of 404 as compared to a theoretical value of 554 (based on the starting material).

The foregoing examples are intended as illustrations of various embodiments of the invention and are not to be interpreted as limitations on the scope thereof.

The compounds of the present invention are useful as chemical intermediates, curing agents for polyepoxy resins, corrosion inhibitors, and fuel oil additives.

The embodiments of the invention in which an exclusive property or privilege is claimed are defined as follows:
1. The compounds represented by the formula

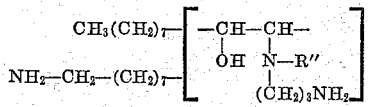

wherein R″ is selected from the group consisting of hydrogen, methyl, ethyl, hexyl, octyl, dodecyl, stearyl, anilino,

—(CH₂)₂NH₂, —(CH₂)₂NH(CH₂)₂—NH₂,

—(CH₂)₃—NH₂, —(CH₂)₂NH(CH₂)₂NH(CH₂)₂NH₂ and hydroxy alkyl radicals in which the alkyl group has from 1-4 carbon atoms.

2. 9(10)-(gamma-aminopropyl)-amino-10(9)-hydroxystearyl amine.
3. 9(10)-(gamma-aminopropyl)-methylamino - 10(9)-hydroxystearyl amine.
4. 9(10)-(gamma-aminopropyl)-dodecylamino - 10(9)-hydroxystearyl amine.
5. 9(10)-(gamma-aminopropyl)-anilino-10(9)-hydroxystearyl amine.
6. 9(10)-(gamma-aminopropyl)-ethanolamino - 10(9)-hydroxystearyl amine.

References Cited in the file of this patent
UNITED STATES PATENTS
2,929,845   Harman et al. _____ Mar. 22, 1960